(12) United States Patent
Oosaki et al.

(10) Patent No.: US 8,129,042 B2
(45) Date of Patent: Mar. 6, 2012

(54) MULTILAYER STRUCTURE AND PROCESS FOR PRODUCING A MULTILAYER STRUCTURE

(75) Inventors: Nobuhiro Oosaki, Sodegaura (JP); Taiichi Sakaya, Chiba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 909 days.

(21) Appl. No.: 11/253,551

(22) Filed: Oct. 20, 2005

(65) Prior Publication Data

US 2006/0088707 A1   Apr. 27, 2006

(30) Foreign Application Priority Data

Oct. 22, 2004   (JP) .................................. 2004-307957

(51) Int. Cl.
*B32B 7/02* (2006.01)
*B32B 9/04* (2006.01)

(52) U.S. Cl. ..................... 428/701; 428/212; 428/411.1; 428/702

(58) Field of Classification Search .................. None
See application file for complete search history.

(56) References Cited

U.S. PATENT DOCUMENTS 4,138,301 A * 2/1979 VanAuken et al. ........... 156/189
(Continued)

FOREIGN PATENT DOCUMENTS

| JP | 3-30944 A | 2/1991 |
| JP | 2002-086610 | 3/2002 |
| JP | 2003-170522 | 6/2009 |

OTHER PUBLICATIONS

Chinese Application No. 200510124973.7 First Office Action dated Mar. 13, 2009.

(Continued)

*Primary Examiner* — Aaron Austin
(74) *Attorney, Agent, or Firm* — Sughrue Mion, PLLC

(57) ABSTRACT

Disclosed is a multilayer structure including a first layer and a second layer adjacent to the first layer, wherein the first layer is formed of a first material comprising a first inorganic laminar compound and a second layer is formed of a second material comprising a second inorganic laminar compound with a volume fraction greater than the volume fraction of the first inorganic laminar compound in the first layer. The multilayer structure may includes a substrate layer. A method for producing the multilayer structure is also disclosed.

9 Claims, No Drawings

U.S. PATENT DOCUMENTS

| | | | | |
|---|---|---|---|---|
| 4,291,084 A | * | 9/1981 | Segal | 428/212 |
| 4,552,793 A | * | 11/1985 | Cameron et al. | 428/53 |
| 4,567,078 A | * | 1/1986 | Blackmore et al. | 428/119 |
| 4,681,722 A | * | 7/1987 | Carter et al. | 264/171.11 |
| 4,960,639 A | * | 10/1990 | Oda et al. | 428/34.5 |
| 4,970,113 A | * | 11/1990 | Yamada | 428/323 |
| 5,665,442 A | * | 9/1997 | Andersen et al. | 428/36.4 |
| 5,766,751 A | | 6/1998 | Kotani et al. | |
| 2003/0003197 A1 | | 1/2003 | Berlin et al. | |
| 2009/0047492 A1 | * | 2/2009 | Oosaki et al. | 428/218 |

OTHER PUBLICATIONS

Chinese Application No. 200510124973.7 Second Office Action dated Nov. 6, 2009.

Chinese Application No. 200510124973.7 Third Office Action dated Oct. 25, 2010.

Chinese Application No. 200510124973.7 Decision of Rejection dated Feb. 12, 2011.

JPA 2005-306726 Office Action dated Mar. 1, 2011.

* cited by examiner

MULTILAYER STRUCTURE AND PROCESS FOR PRODUCING A MULTILAYER STRUCTURE

BACKGROUND OF THE INVENTION

1. Field of the Invention

This invention relates to a multilayer structure and a process for the production of a multilayer structure.

2. Description of the Related Art

Molded articles made of thermoplastic resin such as polypropylene, polyester and polyamide are heretofore used widely as packaging material in the food product industry, cosmetic product industry, agrochemical industry and medical industry because of their superior mechanical properties, heat resistance, transparency, etc. In use of a thermoplastic resin molded article as packaging material, the molded article is often required to have gas barrier properties in order to prevent the content from being degraded by oxygen. As an example of such packaging material with a gas barrier property, JP 03-30944 A discloses a packaging material comprising a substrate film having thereon one layer comprising polyvinyl alcohol and synthetic hectorite, which is an inorganic laminar compound.

However, packaging materials having one layer including an inorganic laminar compound are insufficient in gas barrier properties under highly humid conditions.

SUMMARY OF THE INVENTION

The present invention provides a structure superior in gas barrier properties under highly humid conditions and a process for producing the structure.

The present invention provides, in one aspect, a multilayer structure comprising a first layer and a second layer adjacent to the first layer, wherein the first layer is formed of a first material comprising a first inorganic laminar compound and a second layer is formed of a second material comprising a second inorganic laminar compound with a volume fraction greater than the volume fraction of the first inorganic laminar compound in the first layer.

The present invention provides, in another aspect, a process for producing a multilayer structure comprising a layer of a substrate, a first layer which is disposed on the layer of the substrate, and a second layer which is disposed on the first layer, the first layer being formed of a first material comprising a first inorganic laminar compound and a second layer being formed of a second material comprising a second inorganic laminar compound with a volume fraction greater than the volume fraction of the first inorganic laminar compound in the first layer, the process comprising a step of applying a first coating slip comprising a first liquid medium and the first material contained therein onto a substrate and then removing the first liquid medium, thereby forming the first layer on the layer of the substrate, and a step of applying a second coating slip comprising a second liquid medium and the second material contained therein onto the first layer and then removing the second liquid medium, thereby forming the second layer on the first layer, wherein the first coating slip and the second coating slip satisfy a requirement that the ratio of the dry volume of the second inorganic laminar compound to the dry volume of the second material is higher than the ratio of the dry volume of the first inorganic laminar compound to the dry volume of the first material.

The multilayer structures of the present invention are superior in gas barrier properties under highly humid conditions. The process of the present invention for producing method of a multilayer structure can afford multilayer structures superior in gas barrier properties under highly humid conditions.

DESCRIPTION OF THE PREFERRED EMBODIMENTS

The multilayer structure of the present invention has a first layer which is formed of a first material comprising a first inorganic laminar compound and a second layer which is formed of a second material comprising a second inorganic laminar compound with a volume fraction greater than the volume fraction of the first inorganic laminar compound in the first layer.

As the first inorganic laminar compound contained in the first layer and the second inorganic laminar compound contained in the second layer, clay minerals having swellability or cleavability in solvent are preferably used.

The "inorganic laminar compound" used herein refers to an inorganic substance in which unit crystal layers are mutually stacked to form a layered structure. The "layered structure" referred to herein means a structure such that planes in which atoms bonding strongly to each other through covalent bonds or the like are arranged densely are stacked approximately parallel to each other by weak bonding force such as Van der Waals force.

Among inorganic laminar compounds, clay minerals having swellability in solvent are preferably used.

The clay minerals may be classified into two types, i.e., (i) a type having a two-layer structure, which comprises a silica tetrahedral layer, and an octahedral layer disposed thereon and comprising a central metal such as aluminum and magnesium; and (ii) a type having a three-layer structure, which comprises an octahedral layer comprising a central metal such as aluminum and magnesium, and a silica tetrahedral layer disposed on the both sides of the octahedral layer so as to sandwich the octahedral layer. Examples of (i) two-layer structure type of clay minerals include clay minerals of the kaolinite group and antigorite group. Examples of (ii) three-layer structure type of clay minerals include clay minerals of the smectite group, vermiculite group and mica group, which are classified depending on the number of interlayer cation(s).

Specific examples of such clay minerals include kaolinite, dickite, nacrite, halloysite, antigorite, chrysotile, pyrophyllite, montmorillonite, beidellite, nontronite, saponite, sauconite, stevensite, hectorite, tetrasilylicmica, sodium taeniolite, muscovite, margarite, talc, vermiculite, phlogopite, xanthophyllite and chlorite. Clay minerals whose dispersability or the like have been improved through treatment, e.g. ion exchange, with an organizing agent (see "Dictionary of Clay" published by Asakura Shoten; hereinafter referred to as "organically modified clay mineral") are also available as inorganic laminar compounds. Examples of the organizing agent include quaternary ammonium salts such as dimethyl distearyl ammonium salt, trimethyl stearyl ammonium salt, quaternary ammonium salts having a benzyl group and quaternary ammonium salt having a polyoxyethylene group, phosphonium salts and imidazolium salts.

Among the above-mentioned clay minerals, clay minerals of the smectite group, vermiculite group and mica group are preferred and those of the smectite group are particularly preferred. Examples of the smectite group clay minerals include montmorillonite, beidellite, nontronite, saponite, sauconite, stevensite and hectorite. In particular, montmorillonite is preferably used.

Neither the inorganic laminar compound contained in the first layer nor the inorganic laminar compound contained in the second layer is restricted with respect to aspect ratio. However, inorganic laminar compounds with aspect ratios of from 200 to 3000 are preferably used. If the aspect ratio of the inorganic laminar compound to be used is too small, the gas barrier properties tend to be insufficient. If the aspect ratio is too large, it tends to be difficult to swell or cleave the inorganic laminar compound, resulting in insufficient gas barrier properties.

It is desirable for the inorganic laminar compound contained in the first layer and the inorganic laminar compound contained in the second layer to have an average particle diameter of 5 µm or less. If the average particle diameter is too large, the product tends to be insufficient in gas barrier property, transparency and film formability. Especially in applications where transparency is required, the average particle diameter is preferably up to 1 µm.

In the present invention, the aspect ratio (Z) of an inorganic laminar compound is defined by a formula Z=L/a where "L" is the average particle diameter of the inorganic laminar compound and "a" is the unit thickness of the inorganic laminar compound, namely, the thickness of unit crystal layers of the inorganic laminar compound, which is determined by the powder x-ray diffraction method (see "Guide to Instrumental Analysis (a)" p. 69, Edited by Jiro Shiokawa, published by Kagaku-Dojin Publishing Company, Inc. (1985).

The average particle diameter of an inorganic laminar compound is the particle diameter determined the diffraction/scattering method carried out in liquid medium, namely, a median diameter based on the volume. Specifically, the average particle diameter is determined, by the Mie scattering theory, through calculation of a particle size distribution most consistent to a diffraction/scattering pattern obtained by passing a beam of light through a dispersion liquid of an inorganic laminar compound. More specifically, the average particle diameter of an inorganic laminar compound in its dispersion is measured using a laser diffraction/scattering particle size distribution analyzer. The average particle diameter is considered as the average particle diameter "L" of the inorganic laminar compound. When an inorganic laminar compound is fully swollen and cleaved in liquid medium of a type the same as that used in the determination of the average particle diameter of the inorganic laminar compound by the diffraction/scattering method, and then mixed with resin, etc., the particle diameter of the inorganic laminar compound swollen and cleaved in the resin is considered to be approximately equal to the particle diameter of the inorganic laminar compound measured in the liquid medium.

Specifically, as the first inorganic laminar compound included in the first layer and the second inorganic laminar compound included in the second layer, those which show a swell value of 5 or more in the swellability test described below are preferred, and those which show a swell value of 20 or more are more preferred. In addition, those which show a cleavage value of 5 or more in the cleavability test described below are preferred, and those which show a cleavage value of 20 or more are more preferred.

<Swellability Test>

In a 100-ml graduated cylinder is placed 100 ml of liquid medium, and 2 g of an inorganic layer compound is added thereto. After standing at 23° C. for 24 hours, the volume in milliliter of the inorganic layer compound dispersion layer in the graduated cylinder is read from the graduation at the interface between the inorganic layer compound dispersion layer and the supernatant liquid. The larger the value (swell value), the higher the swellability.

<Cleavability Test>

30 g of an inorganic laminar compound is added slowly to 1500 mL of liquid medium, and is dispersed by means of a disperser (DESPA MH-L manufactured by Asada Iron Works Co., Ltd.; vane diameter=52 mm, rotating speed=3100 rpm, container capacity=3 L, distance between the bottom face and the vane=28 mm) with a peripheral speed of 8.5 m/sec at 23° C. for 90 minutes. Thereafter, 100 mL of the resultant dispersion is taken out and placed into a graduated cylinder, and then is left standing for 60 minutes. Then, the volume of the dispersion layer of the inorganic laminar compound is read from the graduation. After standing for 60 minutes, the volume in milliliter of the inorganic layer compound dispersion layer in the graduated cylinder is read from the graduation at the interface between the inorganic layer compound dispersion layer and the supernatant liquid. The larger the value (cleavage value), the higher the cleavability.

Examples of the liquid medium in which an inorganic laminar compound is swollen or cleaved include, when the inorganic laminar compound is hydrophilic clay mineral, water, alcohols (methanol, ethanol, propanol, isopropanol, ethylene glycol and diethylene glycol), dimethylformamide, dimethylsulfoxide and acetone. In particular, water, alcohols and water-alcohol mixtures are preferred.

When the inorganic laminar compound is an organically modified clay mineral, aromatic hydrocarbons such as benzene, toluene and xylene; ethers such as ethyl ether and tetrahydrofuran; ketones such as acetone, methyl ethyl ketone and methyl isobutyl ketone; aliphatic hydrocarbons such as n-pentane, n-hexane and n-octane; halogenated hydrocarbons such as chlorobenzene, tetrachloromethane, chloroform, dichloromethane, 1,2-dichloroethane and perchloroethylene; ethyl acetate, methyl methacrylate, dioctyl phthalate, dimethylformamide, dimethylsulfoxide, methyl cellosolve, silicone oil, etc. may be used as the liquid medium.

The first layer may include either one kind of inorganic laminar compound or two or more kinds of inorganic laminar compounds. Likewise, the second layer may include either one kind of inorganic laminar compound or two or more kinds of inorganic laminar compounds.

The inorganic laminar compound included in the first layer may be either the same as or different from the inorganic laminar compound included in the second layer.

The first layer contains a component other than the inorganic laminar compound. The component other than the inorganic laminar compound is typically resin, and preferably thermoplastic resin.

Examples of the resin contained in the first layer include polyvinyl alcohol (PVA), ethylene-vinyl alcohol copolymer (EVOH), polyvinylidene chloride (PVDC), polyacrylonitrile (PAN), polysaccharide, polyacrylic acid and esters thereof, and urethane resin.

From the viewpoint of the gas barrier property of the multilayer structure, the resin contained in the first layer is preferably a resin such that when an oxygen transmission rate is measured at 23° C. and 0% RH using a 25-µm thick film composed only of the resin, the oxygen transmission rate is 1000 cc/m²·day·atm or less. When it is difficult to form a film composed only of the resin, a layer of the resin whose oxygen transmission rate is intended to be measured is formed on a substrate film composed of another resin with known oxygen transmission rate. Thus, a laminate film is formed. This laminate film is then measured for its oxygen transmission rate. The oxygen transmission rate of the resin layer formed on the substrate film is calculated using the following equation:

$$1/P = (1/P1) + (1/P2)$$

P: oxygen transmission rate of a laminated film (cc/m²·day·atm)

P1: oxygen transmission rate of a substrate film (cc/m²·day·atm)

P2: oxygen transmission rate of a resin layer (cc/m²·day·atm).

Specifically, a 25-μm thick PET film is used as the substrate film. On the substrate film, a layer of the resin whose oxygen transmission rate is intended to be measured is formed and its oxygen transmission rate is measured. Thus, the oxygen transmission rate per 25-μm thick resin layer is calculated.

Examples of the resin satisfying the above-mentioned oxygen transmission rate requirement include PVA, EVOH, PVDC, PAN, polysaccharide, polyacrylic acid and its ester, polyamide, polyester and urethane resin.

Examples of the urethane resin include conventional one-component curable urethane resins and two-component curable urethane resin formed through a reaction between a polyol and an isocyanate compound.

The polysaccharide used herein refers to biopolymers which are synthesized by polycondensation of various monosaccharides in organisms and include chemically modified polysaccharides. Specific examples thereof include cellulose, cellulose derivatives such as hydroxymethylcellulose, hydroxyethylcellulose, and carboxymethylcellulose; and amylose, amylopectin, pullulan, curdlan, xanthan, chitin and chitosan.

Polyvinyl alcohol is the most desirable as the resin contained in the first layer because of the easiness in its dissolution in aqueous dispersion medium, the easiness in its handling, and the gas barrier property of resulting multilayer structures. The "polyvinyl alcohol" used herein refers to a polymer predominantly comprising a monomer unit of vinylalcohol. Specific examples of such "polyvinyl alcohol" include a polymer obtained by hydrolyzing acetic acid portions of a vinyl acetate polymer (exactly, a copolymer of vinyl alcohol and vinyl acetate), and polymers obtained by hydrolyzing a polymer such as vinyl trifluoroacetate polymer, vinyl formate polymer, vinyl pivalate polymer, t-butyl vinyl ether polymer, and trimethylsilyl vinyl ether polymer. Regarding the details of the "polyvinyl alcohol", a book entitled "The World of PVA" edited by POVAL Society (1992), published by Polymer Publishing Association; and a book entitled "POVAL" written by Nagano et al. (1981), published by Polymer Publishing Association may be referred to. The degree of "saponification" of the polyvinyl alcohol is 70 mole % or more, more preferably 85 mole % or more. Particularly preferred is a product with a degree of saponification of 98 mole % or more, namely, so-called "completely saponified polyvinyl alcohol". The degree of polymerization is preferably from 100 to 5000, more preferably from 200 to 3000.

The second layer may either be composed only of an inorganic laminar compound or contain one or more other components in addition to the inorganic laminar compound. Examples of the components other than the inorganic laminar compound which may be contained in the second layer include resins such as those which may be contained in the first layer. When the second layer contains a resin, the resin is preferably polyvinyl alcohol because it is superior in gas barrier property and it is easy to handle.

In the multilayer structure of the present invention, the second layer is disposed adjacent to the first layer. The volume fraction of the inorganic laminar compound in the second layer is higher than the volume fraction of the inorganic laminar compound in the first layer.

It has heretofore been believed that the gas barrier property of a structure having a layer containing an inorganic laminar compound is improved as the volume fraction of the inorganic laminar compound in the layer increases. If it is true, layers containing an inorganic laminar compound with the same volume fraction of the inorganic laminar compound must have the same gas barrier property. However, in comparison of a multilayer structure of the present invention in which the first and second layers, which differ in volume fraction of inorganic laminar compounds, are disposed adjacent to each other with a structure having one layer containing an inorganic laminar compound with a volume fraction equal to the average inorganic laminar compound volume fraction of the first and second layers (namely, {(the volume of the inorganic laminar compound in the first layer)+(the volume of the inorganic laminar compound in the second layer)}/{(the volume of the first layer)+(the volume of the second layer)}×100), it has become clear that the multilayer structure of the present invention is superior to the other in gas barrier property under highly humid conditions.

From the viewpoint of gas barrier property under highly humid conditions, it is desirable that the volume fraction of the inorganic laminar compound in the second layer be from 70 to 100 vol. % and be at least 10 vol. % higher than the volume fraction of the inorganic laminar compound in the first layer. The volume fraction of the inorganic laminar compound in the second layer is more preferably 75 vol. % or more, still more preferably 80 vol. % or more, even more preferably 90 vol. % or more, and optimally 100 vol. %. By making the difference in volume fraction of the inorganic laminar compound between the first and second layers larger, it becomes easier to form the second layer with a high volume fraction of an inorganic laminar compound uniformly, resulting in the improvement in adhesiveness between the first and second layers. When the first layer and/or the second layer is formed by application of a coating slip containing the inorganic laminar compound followed by drying, the volume fraction of the inorganic laminar compound based on the volume of the residue of the coating slip obtained by removing volatile components completely from the coating slip is considered as the volume fraction of the inorganic laminar compound in the layer.

The volume fraction of the inorganic laminar compound in the first layer is preferably less than 70 vol. %, more preferably from 5 to 50 vol. %, still more preferably 10 vol. % or more, even more preferably 15 vol. % or more, and optimally 20 vol. % or more. By determining the volume fraction of the inorganic laminar compound in the first layer as described above, it is possible to obtain a multilayer structure having more improved gas barrier properties under highly humid conditions.

When a layer containing an inorganic laminar compound is formed by application of a coating slip containing the inorganic laminar compound followed by drying, the volume fraction of the inorganic laminar compound in the first layer is more preferably up to 40 vol. %, still more preferably up to 35 vol. %, and optimally up to 30 vol. % from the viewpoint of the coatability of the slip.

The multilayer structure of the present invention may have a layer of a substrate, which layer is hereinafter referred to as "substrate layer". The material forming the substrate layer may be, but is not particularly limited to, metal, resin, wood, ceramic and glass. The form of the substrate layer may be, but is not particularly limited to, paper, woven fabric, nonwoven fabric and film. As the resin, thermoplastic resin and thermosetting resin are available. When the multilayer structure of the present invention is used as packaging material, the substrate layer is desirably made of thermoplastic resin. Specific examples of the thermoplastic resin to be used include: polyolefin resin such as low density polyethylene, high density polyethylene, linear low density polyethylene, ethylene-propylene copolymer, ethylene-butene copolymer, ethylene-hexene copolymer, ethylene-octene copolymer, polypropylene (PP), ethylene-vinyl acetate copolymer, ethylene-methyl methacrylate copolymer and ionomer resin; polyester resins such as polyethylene terephthalate, polybutylene terephthalate and polyethylene naphthalate; amide resins such as Nylon-6 (Ny-6), Nylon-6,6, polymetaxylylene diadipamide (MXD6-Ny) and polymethyl methacrylimide; acrylic resins such as polymethyl methacrylate; styrene-acrylonitrile resins such as polystyrene, styrene-acrylonitrile copolymer, styrene-acrylonitrile-butadiene copolymer, and polyacrylonitrile; hydrophobilized cellulose resins such as cellulose triacetate and cellulose diacetate; halogen-containing resins such as polyvinyl chloride, polyvinylidene chloride and polyvinylidene fluoride; hydrogen bond-forming resins such as polyvinyl alcohol, ethylene-vinyl alcohol copolymer and cellulose derivatives; polycarbonate resin, polysulfone resin, polyethersulfone resin, polyether ether ketone resin, polyphenylene oxide resin, and polymethylene oxide resin. Examples of the thermoset resin include conventional phenolic plastic, melamine resin and urea resin. When the multilayer structure of the present invention is film, the substrate layer may be any of nonoriented film, uniaxially oriented film and biaxially oriented film and preferably is a biaxially oriented film made of any of polypropylene, polyester resin and amide resin. The substrate layer may be a multilayer film such as those have structures Ny-6/MXD6-Ny/Ny-6 and PP/EVOH/PP. Moreover, it may be a film with aluminum, alumina or silica or the like deposited thereon.

The substrate layer may be disposed adjacent to the first or second layer containing an inorganic laminar compound. Alternatively, it may be joined with the first or second layer via another layer such as an adhesive layer. As discussed later, when the first or second layer is formed on a substrate by coating, it is desirable to produce a multilayer structure including the substrate having thereon the first layer from the viewpoint of the coatability. The first layer may be disposed either on one side or on both sides of the substrate layer. Moreover, it may be formed either partly or wholly on the substrate layer.

The multilayer structure of the present invention may have one or more layers other than the first layer, the second layer and the substrate layer. The multilayer structure may have, in addition to the first layer, one or more layers with a composition the same as that of the first layer. Likewise, it may have, in addition to the second layer, one or more layers with a composition the same as that of the second layer. When the multilayer structure of the present invention has a substrate layer, example of the configuration thereof include:

substrate layer/first layer/second layer (Configuration 1), substrate layer/first layer/second layer/additional layer A containing inorganic laminar compound (Configuration 2), substrate layer/first layer/second layer/additional layer B containing inorganic laminar compound/additional layer C containing inorganic laminar compound (Configuration 3), substrate layer/first layer/second layer/additional layer D containing inorganic laminar compound/additional layer E containing inorganic laminar compound/additional layer F containing inorganic laminar compound (Configuration 4), substrate layer/first layer/second layer/resin layer (Configuration 5), substrate layer/first layer/second layer/additional layer B containing inorganic laminar compound/additional layer C containing inorganic laminar compound/resin layer (Configuration 6), and substrate layer/first layer/second layer/additional layer D containing inorganic laminar compound/additional layer E containing inorganic laminar compound/additional layer F containing inorganic laminar compound/resin layer (Configuration 7).

Each of additional layers A, B, C, D and E may a layer with a composition the same as that of the first or second layer. For example, additional layer A may have a composition the same as that of the first layer in Configuration 2. In Configuration 3, additional layer B may have a composition the same as that of the first layer and additional layer C may have a composition the same as that of the second layer. In Configuration 4, each of additional layers D and F have a composition the same as that of the first layer and additional layer E may have a composition the same as that of the second layer.

When the multilayer structure of the present invention is subjected to boil or retort treatment, the volume fraction of the inorganic laminar compound in an outermost layer is preferably from 60 to 100 vol. %, more preferably 70 vol. % or more, still more preferably 80 vol. % or more, even more preferably 90 vol. % or more, and optimally 100 vol. %. When the volume fraction of the inorganic laminar compound in an outermost layer is within the above range, the multilayer structure is resistant to whitening after the boil or retort treatment, in other words, is superior in whitening resistance. When the multilayer structure of the present invention is used for applications which require whitening resistance, it may have an outermost layer having a composition the same as that of the first layer or the second layer. The second layer may be one of the outermost layers. For example, when the volume fraction of the inorganic laminar compound in the second layer is 60 vol. % or more, the multilayer structure may be of a configuration of substrate layer/first layer/second layer or a configuration of substrate layer/first layer/second layer/(layer containing an inorganic laminar compound with a volume fraction of from 50 to 100 vol. % and having a composition different from that of the second layer).

When the multilayer structure of the present invention is used for applications which require bending resistance, the volume fraction of the inorganic laminar compound in an outermost layer is preferably from 0 to 50 vol. %, more preferably up to 40 vol. % and even more up to 30 vol. %. When an outermost layer contains no inorganic laminar compound, the outermost layer is composed of only resin or resin and additives other than inorganic laminar compounds. Examples of the resin for forming the outermost layer include ethyleneimine resin, butadiene resin, urethane resin, acrylic resin, amide resin and EVOH.

When the multilayer structure of the present invention is used for applications which require bending resistance, it may have an outermost layer having a composition the same as that of the first layer or the second layer. For example, when the volume fraction of the inorganic laminar compound in the second layer is 50 vol. % or less, the multilayer structure may have a configuration of substrate layer/first layer/second layer. In the case where the volume fraction of the inorganic laminar compound in the second layer is great than 50 vol. %, the multilayer structure will be superior in bending resistance as well as gas barrier property under highly humid conditions if the multilayer structure is of a configuration of substrate layer/first layer/second layer/(layer containing an inorganic laminar compound with a volume fraction of from 0 to 50 vol. %). In such a case, the volume fraction of the inorganic laminar compound in the outermost layer which is not the substrate layer may be equal to or different from that of the first layer.

The outermost layer of the multilayer structure of the present invention in the case where the structure is superior in whitening resistance, the outermost layer is preferably (must be) disposed on the second layer formed on the first layer. Likewise, the outermost layer of the multilayer structure of the present invention in the case where the structure is superior in bending resistance, the outer most layer is preferably disposed on the second layer formed on the first layer.

When the multilayer structure of the present invention is in the form of film, it preferably has a heat seal layer. Examples of the resin for forming the heat seal layer include polyolefin resin such as low density polyethylene, high density polyethylene, linear low density polyethylene, ethylene-propylene copolymer, ethylene-butene copolymer, ethylene-hexene copolymer, ethylene-4-methyl-1-pentene copolymer, ethylene-octene copolymer, polypropylene, ethylene-vinyl acetate copolymer, ethylene-methylmethacrylate copolymer, ethylene-methyl acrylate copolymer, ethylene-acrylic acid copolymer and ionomer resin; polyacrylonitrile resin; and polyester resin. Also when the multilayer structure is a container whose opening is to be covered with a lid (e.g. sheet or film) by sealing, the surface of the structure where it is to be sealed with the lid is preferably composed of a sealant layer.

The heat seal layer is usually laminated on a substrate layer. The method for laminating these layers is not particularly restricted. For example, a method comprising coextrusion of the heat seal layer and the substrate layer; a method comprising application of a solution prepared by dissolving, in solvent, the resin for forming the heat seal layer to the substrate layer, followed by removal of the solvent; a method comprising extrusion lamination of the resin for forming the heat seal layer with the substrate layer; and a method comprising dry-lamination of the heat seal layer and the substrate layer may be used. The lamination surfaces of the heat seal layer and the substrate layer may have been subjected to various types of treatment such as corona treatment, ozone treatment, electron beam treatment and application of an anchor coating agent.

The multilayer structure of the present invention having a substrate layer may be produced, for example, by a method in which the multilayer structure is produced by coestrusion, and a method in which a substrate layer prepared by a conventional process such as extrusion or injection molding is adhered with a laminate of the first and second layers stacked together in advance. Because it is easy to form a thin second layer having a high volume fraction of an inorganic laminar compound, preferred is a process comprising a step of applying a first coating slip comprising a first liquid medium and the first material contained therein onto a substrate and then removing the first liquid medium, thereby forming the first layer on the layer of the substrate, and a step of applying a second coating slip comprising a second liquid medium and the second material contained therein onto the first layer and then removing the second liquid medium, thereby forming the second layer on the first layer.

When preparing an inorganic laminar compound coating slip by dispersing the inorganic laminar compound in liquid medium, it is desirable, from the viewpoint of dispersion efficiency, to carry out high pressure dispersion treatment by means of a high pressure dispersing device. Examples of the high pressure dispersing device include an ultrahigh pressure homogeniser manufactured by Microfluidics Corporation (commercial name: MICROFLUIDIZER), NANOMIZER manufactured by Nanomizer Inc., a Manton Gaulin type high pressure dispersing device, and Homogenizer manufactured by Izumi Food Machinery Co., Ltd. The high pressure dispersion treatment used herein is a treatment method comprising forcing a coating slip containing an inorganic laminar compound to pass through capillary tubes at high speed and then combining the flows of the coating slip, thereby causing the flows to collide with each other or against the inner walls of the capillary tubes to apply the coating slip with high shear and/or high-pressure. In the high-pressure dispersion treatment, it is desirable to cause an inorganic laminar compound coating slip to pass through capillary tubes with a diameter of about 1 μm to about 1000 μm so that a maximum pressure of 100 kgf/cm$^2$ or more is applied. The maximum pressure is more preferably 500 kgf/cm$^2$ or more, particularly preferably 1000 kgf/cm$^2$ or more. When the coating slip containing the inorganic laminar compound passes through the capillary tubes, the maximum speed of the coating slip is preferably 100 m/s or more and the rate of heat flow caused by pressure loss is preferably 100 kcal/hr or more.

It is desirable to add a surfactant to the inorganic laminar compound coating slip. By forming the first layer or the second layer or both layers by coating an inorganic laminar compound coating slip containing a surfactant, it is possible to improve the adhesiveness between the layer(s) and a layer adjacent thereto. The content of the surfactant is typically from 0.001 to 5 wt. % on the basis of 100 wt. % of the coating slip. When the amount of the surfactant added is too small, the effect of improving the adhesiveness will be insufficient, whereas when the amount of the surfactant added is too large, barrier properties may be impaired.

As the surfactant, conventional surfactants such as anionic surfactants, cationic surfactants, amphoteric surfactants and nonionic surfactants may be used. In particular, use of an alkali metal salt of carboxylic acid with an alkyl chain having from 6 to 24 carbon atoms, ether type nonionic surfactant (silicone type nonionic surfactants) such as polydimethylsiloxane-polyoxyethylene copolymer, or fluorine-type nonionic surfactant (fluorine-containing nonionic surfactant) such as perfluoroalkylethylene oxide compounds is preferred from the viewpoint of improvement in adhesiveness.

The inorganic laminar compound coating slip containing resin may be prepared by the following methods: e.g., a method comprising mixing a resin solution prepared by dissolution of the resin in solvent with an inorganic laminar compound coating slip prepared by swelling and cleaving the inorganic laminar compound in liquid medium; a method comprising mixing resin directly with an inorganic laminar compound coating slip prepared by swelling and cleaving the inorganic laminar compound in liquid medium; and a method comprising mixing a resin solution with an inorganic laminar compound. The method comprising mixing a resin solution prepared by dissolution of the resin in solvent with an inorganic laminar compound coating slip prepared by swelling and cleaving the inorganic laminar compound in liquid medium is preferred because it is possible to disperse the fully swollen and cleaved inorganic laminar compound in the resin uniformly. In the preparation of the inorganic laminar compound coating slip containing resin, a liquid containing both the resin and the inorganic laminar compound may be subjected to the high pressure dispersion treatment or, alternatively, an inorganic laminar compound coating slip which has been subjected to the high pressure dispersion treatment may be mixed with the resin by using the method described above.

When the resin or resins contained in the first layer or second layer or both layers is a resin or resins-having a hydrogen bond-forming group such as hydroxyl group, amino group, thiol group, carboxyl group, sulfonic acid group and phosphoric acid group or a crosslinkable reactive group such as an ionic group, e.g. carboxylate group, sulfonate ion group, phosphate ion group, ammonium group and phosphonium group, a crosslinking agent may be added to the inorganic laminar compound coating slips for forming those layers. Examples of the crosslinking agent to be used include titanium coupling agent, silane coupling agent, melamine coupling agent, epoxy coupling agent, isocyanate coupling agent, carbodiimide coupling agent, copper compound and zirconia compound. These crosslinking agents may use either alone or in combination.

When adding a crosslinking agent to a coating slip, it is desirable that the proportions of the resin and the crosslinking agent blended be adjusted so that the ratio K of the molar number of groups forming crosslinkage in the crosslinking agent to the molar number of crosslinkable functional groups in the resin (K=CN/HN) becomes from 0.001 to 10, preferably from 0.01 to 1, where the molar number of the crosslinkable functional groups in the resin (namely, the combined molar number of the hydrogen bond-forming groups and ionic groups) is represented by HN and the molar number of groups forming crosslinkage in the crosslinking agent is represented by CN. If the proportion of the crosslinking agent is too small, a water resistance improvement effect will be insufficient, whereas if too large, the coating slip will tend to gelate. When a crosslinking agent is added to an inorganic laminar compound coating slip, a crosslinking agent solution prepared by dissolving 10 to 90 wt. % of the crosslinking agent in solvent such as alcohol is, in typical cases, added to the inorganic laminar compound coating slip.

When a chelate compound is used as the crosslinking agent, the inorganic laminar compound coating slip is preferably acidic, more preferably pH 5 or lower, even more preferably pH 3 or lower from the viewpoint of stability of the inorganic laminar compound coating slip after mixing of the crosslinking agent. The pH of the coating slip has no particular lower limit, but it is typically 0.5 or higher. The coating slip may be acidified through addition of an acidic solution such as hydrochloric acid to the coating slip or application of ion exchange treatment to the coating slip.

The multilayer structure of the present invention is desirably subjected to heat treatment at a temperature from 110° C. to 220° C. prior to use from the viewpoint of improvement in gas barrier property after hot water treatment such as boiling and retorting. The heat source for use in the heat treatment is not particularly restricted and various methods may be used such as heat roll contact, heat medium contact (air, etc.), infrared heating and microwave heating. The heat treatment time is typically 48 hours or less.

The substrate layer may be subjected to surface treatment such as corona treatment, ozone treatment, ion treatment, flame treatment using silane gas or the like, normal pressure or reduced pressure plasma treatment prior to its lamination with another layer. An anchor coat layer may be disposed on the substrate layer. The anchor coat layer may be formed by use of a conventional ethyleneimine-type or two-component curable urethane-type anchor coating agent.

Examples of the process for forming the anchor coat layer, the first layer of the second layer by coating include gravure processes such as the direct gravure process and the reverse gravure process; roll coating processes such as the two-roll beat coating process and the bottom-feed three-roll reverse coating process, the doctor knife process, the die coating process, the bar coating method, the dip coating method and the spray coating process. The additional layers and the resin layers previously described also may be formed by the methods mentioned above. When the multilayer structure is a film, it is desirable to adopt the gravure process because a layer with a uniform thickness can be formed.

The layers constituting the multilayer structure of the present invention are not particularly limited with respect to their thickness. The thicknesses of the first and second layers are typically from 1 nm to 10 μm from the viewpoints of gas barrier property and cost. From the viewpoint of bending resistance, the second layer is preferably thinner than the first layer. Also the thicknesses of the additional layers and resin layers are typically from 1 nm to 10 μm. When the multilayer structure has an anchor coat layer on the substrate layer, the thickness of the anchor coat layer is typically from 0.01 to 5 μm.

The layers constituting the multilayer structure of the present invention may, as needed, contain additives such as UV absorber, colorant and antioxidant unless the effect of the present invention is impaired.

The applications of the multilayer structure of the present invention include tires, screws, optical components such as substrates or sealer for flexible displays such as liquid crystal displays and organic EL, and electronic components such as substrates or sealer for solar batteries or dye sensitizing solar batteries. For example, a coated screw produced by coating the first and second layers on a metallic screw is resistant to oxygen. By converting conventional products having no first and second layers to multilayer structures of the present invention by forming the first and second layers, it is possible to prevent the oxygen-induced degradation of the products which have had a degradation problem caused by oxygen. The multilayer structure of the present invention may also be used as a vacuum heat insulating panel.

Use of the multilayer structure of the present invention as packaging material can prevent the oxygen-induced degradation of the content packed in the packaging material. When The multilayer structure of the present invention is used as packaging material, the form thereof may be film, bag, pouch, bottle, bottle cap, carton container, cup, pan, tray, tank, tube, etc. When the volume fraction of the inorganic laminar compound in an outermost layer of the multilayer structure of the present invention is from 60 to 100 vol. %, the multilayer structure is suitably employed as packaging material for boiling or retorting because of its superior whitening resistance after boiling or retorting. Examples of the content which is packed in the multilayer structure of the present invention include foods such as Western-style cakes, Japanese confections, e.g. Daifuku and rice cake, snack foods such as potato chips, seafood products such as "chikuwa" and "kamaboko", miso, pickles, konnyaku, meatballs, hamburger steaks, sausages, beverages such as coffee, tea and soup, dairy products such as milk and yogurt, boiled rice and curry. The multilayer structure of the present invention may be used for packaging toiletries such as detergents, bath additives and cosmetics; fuels such as gasoline, and hydrogen gas; medical drugs and instruments such as epipastics, tablets, eye drops and infusion solution bags; electronic components and devices such as hard disks and silicon wafers.

EXAMPLES

Hereinafter, the present invention will be described in detail with reference to Examples, by which the present invention is not limited. The methods of measuring physical properties are described below.

<Thickness Measurement>

A thickness of not less than 0.5 μm was measured by means of a commercially available digital thickness measuring device (contact-type thickness measuring device, commercial name: Ultra-High Precision Deci-Micro Head MH-15M, manufactured by Nihon Kogaku K.K.). A thickness less than 0.5 μm was determined through cross section observation by a transmission electron microscope (TEM).

<Particle Size Measurement>

The particle diameter was measured using a laser diffraction/scattering particle size distribution analyzer (LA910 manufactured by Horiba, Ltd.). The average particle diameter of an inorganic laminar compound in a coating slip of the inorganic laminar compound was measured at a light path length of 4 mm and the so-obtained average particle diameter was considered as the average particle diameter L of the inorganic laminar compound.

In addition, the average particle diameter of the inorganic laminar compound in the dispersion was measured by the paste cell method at a light path length of 50 μm. When the average particle diameter approximately agreed with the average particle diameter "L" determined by the flow cell method, the inorganic laminar compound in the coating slip was considered to be fully swollen and cleaved in the coating slip.

<Aspect Ratio Calculation>

The diffraction measurement by the powder method was carried out for an inorganic laminar compound itself by using an X-ray diffractometer (XD-5A, manufactured by Shimadzu Corporation). By the measurement, the unit thickness "a" of the inorganic laminar compound was determined. Moreover, the aspect ration "Z" was calculated using the unit thickness "a" and the particle diameter "L" determined above, on the basis of the formula Z=L/a. By conducting an X-ray diffraction measurement also for a material obtained by drying a first coating slip used for the formation of the first layer, the fact that the spacing of the inorganic laminar compound had been expanded was confirmed.

<Bending Resistance Test>

The bending resistance was evaluated according to ASTM F392. A multilayer film sized 210 mm×297 mm was aged at 23° C., 50% RH for 24 hours and then was shaped into the form of a tube by matching the 210-mm long sides. Using a Gelvo type Flex-Cracking Tester with a chamber (manufactured by TESTER SANGYO CO., LTD.), the tubular film was subjected to 100 cycles of operation including twisting it around its longitudinal axis by 440 degrees and then untwisting.

<Boiling Treatment>

A multilayer film (210 mm×300 mm) with a heat seal layer on one side which had been aged at 23° C., 50% RH for 24 hours was folded in half with the heat seal layer inside. Using a heat sealer (FUJI IMPULSE T230; manufactured by FUJI IMPULSE CO. LTD.), the folded film was heat sealed along two sides with a heat seal width of 10 mm at a temperature of 150° C. for a time of 1 second. Thus, a bag sized 105 mm×150 mm was produced. 50 cc of water was poured into this bag and the remaining side was heat sealed under conditions the same as those mentioned above to form a sealed bag. This sealed bag was boiled at 98° C. for 60 minutes. After the boiling, the bag was preserved under the atmosphere at 23° C., 50% RH for 24 hours and then the appearance of the sealed bag was evaluated by visual observation.

◯: No whitening was observed.

Δ: Slight whitening was observed.

x: Whitening was observed.

<Oxygen Transmission Rate>

Based on JIS K-7126, the oxygen transmission rate was measured at 23° C., 90% RH or at 23° C., 50% RH using an ultrahigh sensitive oxygen transmission rate tester (OX-TRAN ML, manufactured by MOCON Inc.).

<Preparation of Coating Slip>

(1) Preparation of the First Coating Slip

In a dispersion vessel (commercial name: DESPA MH-L, manufactured by ASADA IRON WORKS. CO., LTD.), 1300 g of ion exchange water (specific electric conductance: 0.7 μs/cm or less) and 130 g of polyvinyl alcohol (PVA117H, manufactured by Kuraray Co., Ltd., degree of saponification: 99.6%, degree of polymerization: 1,700) are mixed and heated to 95° C. under low-speed stirring (1500 rpm, peripheral speed: 4.1 m/min). After stirring the mixture at that temperature for 30 minutes to dissolve the polyvinyl alcohol, the mixture was cooled to 60° C. Thus, an aqueous polyvinyl alcohol solution was obtained. While the aqueous polyvinyl alcohol solution (60° C.) was stirred under the above-mentioned conditions, an aqueous alcohol solution prepared by mixing 122 g of 1-butanol, 122 g of isopropyl alcohol and 520 g of ion exchange water was dropped in five minutes. After completion of the dropping, the stirring mode was switched to high-speed stirring (3,000 rpm, peripheral speed: 8.2 m/min). To the stirring system, 65 g of high purity montmorillonite (commercial name: Kunipia G; manufactured by KUNIMINE INDUSTRIES CO., LTD.) was added slowly. After the completion of the addition, stirring was continued at 60° C. for 60 minutes. Then, 243 g of isopropanol was further added in 15 minutes and the mixture was subsequently cooled to room temperature. Thus, a first liquid containing an inorganic laminar compound was obtained. To the first liquid containing an inorganic laminar compound was added 0.1 wt. %, based on the weight of the first liquid, of nonionic surfactant (polydimethylsiloxane-polyoxyethylene copolymer, commercial name: SH3746, manufactured by Toray Dow Corning Co., Ltd.). The resulting mixture was treated under a condition of 1100 kgf/cm$^2$ by means of a high pressure dispersing device (commercial name: super high pressure Homogenizer M110-E/H, manufactured by Microfluidics Corporation). Thus, a first dispersion was obtained. The montmorillonite cleaved in the first dispersion had an average particle diameter of 560 nm, a value of "a" determined by powder X-ray diffraction of 1.2156 nm, and an aspect ratio of 460. To 1000 g of the first dispersion, 1000 g of ion exchange water and 1000 g of isopropyl alcohol were added. To the resulting mixture, 2.66 g of titanium acetylacetonate (commercial name: TC100, manufactured by Matsumoto Chemical Industry Co., Ltd.) was added slowly under low-speed stirring (1500 rpm, peripheral speed: 4.1 m/min) while the pH of the system was adjusted to be 3 or lower by using hydrochloric acid. Thus, a first coating slip was prepared. When the combined volume of the polyvinyl alcohol and the inorganic laminar compound in the first coating slip was assumed 100%, the volume fraction of the inorganic laminar compound was 20 vol. %.

(2) Preparation of the Second Coating Slip

While 1000 g of ion exchange water and 1000 g of isopropanol were high-speed stirred (3,000 rpm, peripheral speed: 8.2 m/min) at room temperature by means of a stirrer, 12 g of high purity montmorillonite (commercial name: Kunipia G; manufactured by KUNIMINE INDUSTRIES CO., LTD.) was added slowly to the stirred system. After the completion of the addition, stirring was continued at room temperature for 60 minutes. Then, the pH of the system was adjusted to be 3 or lower. Thus, a second coating slip was prepared.

(3) Preparation of the Third Coating Slip

A third coating slip was prepared in a manner the same as that of the preparation of the first coating slip except the amount of montmorillonite added was changed to 122 g. When the combined volume of the polyvinyl alcohol and the inorganic laminar compound in the third coating slip was assumed 100%, the volume fraction of the inorganic laminar compound was 32 vol. %.

(4) Preparation of the Fourth Coating Slip

A fourth coating slip was prepared in a manner the same as that of the preparation of the first coating slip except the amount of montmorillonite added was changed to 111 g. When the combined volume of the polyvinyl alcohol and the inorganic laminar compound in the fourth coating slip was assumed 100%, the volume fraction of the inorganic laminar compound was 30 vol. %.

Example 1

A 15-μm thick biaxially oriented Nylon (ONy) film (commercial name: ON-U; manufactured by Unitika, Ltd.), one side of which had been corona treated, was used as a substrate. To the corona-treated surface of the substrate, the first coating slip was gravure coated by the microgravure coating method (the number of gravure lines: 300) at a coating speed of 3 m/min by means of a test coater (manufactured by Yasui Seiki Co.). When the coated film was dried at a drying temperature of 100° C., a first layer including an inorganic laminar compound was formed. The first layer had a thickness of 0.04 μm. The first layer is named Layer A1. On Layer A1, the second coating slip was applied and dried in a manner the same as that for the first coating slip. Thus, a second layer including an inorganic laminar compound was formed. The second layer is named Layer B1. Further, Layer A2 was formed by applying and drying the first coating slip on Layer B1 in a manner analogous to previous one. Subsequently, Layer B2 was formed by applying and drying the second coating slip on Layer A2 in a manner analogous to previous one. Finally, Layer A3 was formed by applying and drying the first coating slip on Layer B2. In this manner, the first coating slip was applied three times and the second coating slip was applied twice, alternately, resulting in a multilayer structure composed of six layers including the substrate layer (substrate layer/Layer A1/Layer B1/Layer A2/Layer B2/Layer A3). The overall thickness of the layers containing an inorganic laminar compound in the multilayer structure after drying, namely, the thickness of Layer A1/Layer B1/Layer A2/Layer B2/Layer A3 was 0.14 μm. The volume fraction of the inorganic laminar compound in each of Layer A1, Layer A2 and Layer A3 is rationally considered to be equal to the volume fraction of the inorganic laminar compound based on the combined volume of the polyvinyl alcohol and the inorganic laminar compound in the first coating slip and, therefore, is 20 vol. %. The volume fraction of the inorganic laminar compound in each of Layer B1 and Layer B2 was 100 vol. %. Because the thickness of Layer A1 was 0.04 μm, Layer A2 and Layer A3, which were formed under conditions the same as those for Layer A1, each had a thickness of 0.04 μm. Moreover, because the overall thickness of the layers containing the inorganic laminar compound was 0.14 μm, the thicknesses of Layer B1 and Layer B2 were each determined to be 0.01 μm. The average volume fraction of the inorganic laminar compound throughout Layers A1, B1, A2, B2 and A3 was 32 vol. %.

For the resulting multilayer structure, the oxygen transmission rate measurement, the boiling test and the bending resistance test were carried out and the results are shown in Table 1.

Example 2

A multilayer structure was produced in the same manner as Example 1 except that Layer A3 was not formed. The resulting multilayer structure had a configuration: substrate layer/Layer A1/Layer B1/Layer A2/Layer B2/. The overall thickness of the layers containing an inorganic laminar compound after drying, namely, the thickness of Layer A1/Layer B1/Layer A2/Layer B2 was 0.10 μm. The volume fraction of the inorganic laminar compound in each of Layer A1 and Layer A2 was 20 vol. %. The volume fraction of the inorganic laminar compound in each of Layer B1 and Layer B2 was 100 vol. %. The average volume fraction of the inorganic laminar compound throughout Layers A1, B1, A2 and B2 was 36 vol. %.

For the resulting multilayer structure, the oxygen transmission rate measurement, the boiling test and the bending resistance test were carried out and the results are shown in Table 1.

Example 3

A multilayer structure was produced in the same manner as Example 1 except that the fourth coating slip was used instead of the first coating slip. The resulting multilayer structure had a configuration: substrate layer/Layer D1/Layer B1/Layer D2/Layer B2/Layer D3. The overall thickness of the layers containing an inorganic laminar compound after drying, namely, the thickness of Layer D1/Layer B1/Layer D2/Layer B2/Layer D3 was 0.14 μm. The volume fraction of the inorganic laminar compound in each of Layer D1, Layer D2 and Layer D3 was 30 vol. %. The volume fraction of the inorganic laminar compound in each of Layer B1 and Layer B2 was 100 vol. %. The average volume fraction of the inorganic laminar compound throughout Layers D1, B1, D2, B2 and D3 was 43 vol. %.

For the resulting multilayer structure, the oxygen transmission rate measurement was carried out and the results are shown in Table 1.

Comparative Example 1

A multilayer structure was produced in the same manner as Example 1 except that the first coating slip was used instead of the second coating slip. The resulting multilayer structure had a configuration: substrate layer/Layer A1. The thickness of Layer A1 after drying was 0.20 μm. The volume fraction of the inorganic laminar compound in Layer A1 was 20 vol. %.

For the resulting multilayer structure, the oxygen transmission rate measurement, the boiling test and the bending resistance test were carried out and the results are shown in Table 1.

Comparative Example 2

A multilayer structure was produced in the same manner as Example 1 except that the second coating slip was used instead of the first coating slip. The resulting multilayer structure had a configuration: substrate layer/Layer B1. The thickness of Layer B1 after drying was about 0.05 μm. Layer B1 was not adhered sufficiently to the substrate layer and was in conditions such that it tended to come off. When it was touched with fingers, the inorganic laminar compound adhered to the fingers. The volume fraction of the inorganic laminar compound in Layer B1 was 100 vol. %.

For the resulting multilayer structure, the oxygen transmission rate measurement and the bending resistance test were carried out and the results are shown in Table 1.

Comparative Example 3

Layer C1 was formed on a substrate in the same manner as Example 2 except that the third coating slip was used instead of the first and second coating slips. Thus, a multilayer structure was obtained. The resulting multilayer structure had a configuration: substrate layer/Layer C1. The thickness of Layer C1 after drying was about 0.14 μm. The volume fraction of the inorganic laminar compound in Layer C1 was 32 vol. %.

For the resulting multilayer structure, the oxygen transmission rate measurement was carried out and the results are shown in Table 1.

Comparative Example 4

For a multilayer structure in which a 0.10-μm thick layer composed of polyvinyl alcohol and an inorganic laminar compound whose volume fraction was 36 vol. % had been formed on a substrate layer, an oxygen transmission rate was calculated using Nielsen's theoretical formula to be 4.8 cc/m²·day·atm.

When the volume fraction $\Phi$ of the inorganic laminar compound is 32 vol. %), $P(32 \text{ vol. \%}) = 0.0091 \cdot P0$.

When the volume fraction $\Phi$ of the inorganic laminar compound is 36 vol. %), $P(36 \text{ vol. \%}) = 0.0076 \cdot P0$.

Based on both relations, the oxygen transmission rate when the volume fraction of the inorganic laminar compound is 36 vol. % is 0.0076/0.0091 times the oxygen transmission rate when the volume fraction is 32 vol. %. From Comparative Example 3, the volume fraction of the inorganic laminar compound is 32 vol. % is 4.1 cc/m²·day·atm. Therefore, the oxygen transmission rate when the volume fraction of the inorganic laminar compound is 36 vol. % is calculated to be 3.4 cc/m²·day·atm.

The gas transmission rate is inversely proportional to the thickness of the gas barrier layer. The value shown above is a value when the layer thickness is 0.14 μm. The oxygen transmission rate at a layer thickness of 0.10 μm like in Example 2 is calculated to be 4.8 cc/m²·day·atm.

Comparative Example 5

For a multilayer structure in which a 0.14-μm thick layer composed of polyvinyl alcohol and an inorganic laminar compound whose volume fraction was 43 vol. % had been formed on a substrate layer, an oxygen transmission rate at 23° C.×90% RH was calculated in the same manner as Comparative Example 4 to be 2.6 cc/m²·day·atm.

TABLE 1

| | Overall thickness of layers containing inorganic laminar compound (μm) | Oxygen transmission rate (cc/m²·day·atm) | | | Condition after boiling (visual observation) |
|---|---|---|---|---|---|
| | | Before bending resistance test | | After bending resistance test | |
| | | 23° C. 50% RH | 23° C. 90% RH | 23° C. 50% RH | |
| Example 1 | 0.14 | <0.1 | 1.5 | 4.7 | Δ |
| Example 2 | 0.10 | <0.1 | 3.9 | 6.5 | ◯ |
| Example 3 | 0.14 | <0.1 | 1.1 | — | — |
| Comparative Example 1 | 0.20 | <0.1 | 12.7 | 7.1 | Δ |
| Comparative Example 2 | 0.05 | >20 | >20 | >20 | — |
| Comparative Example 3 | 0.14 | — | 4.1 | — | — |
| Comparative Example 4 | 0.10 | — | 4.8 (calculated) | — | — |
| Comparative Example 5 | 0.14 | — | 2.6 (calculated) | — | — |

Calculation:

Nielsen's theoretical formula (Lawrence E. Nielsen, Models for the Permeability of Filled Polymer Systems, J. MACROMOL. SCI. (CHEM.), 1967, A1(5), 929-942)

$P/P0 = (1-\Phi)/(1+A\Phi/2)$

P: gas transmission rate of the system
P0: gas transmission rate of the resin
A: aspect ratio of the inorganic laminar compound
$\Phi$: volume fraction of the inorganic laminar compound The aspect ratio of the inorganic laminar compound, A, is 460 (constant). The resin is polyvinyl alcohol and the gas transmission rate of the resin, P0, is constant. Then, the gas transmission rate of the system, P, is represented by a function can be expressed only as a function only of the volume fraction, $\Phi$, of the inorganic laminar compound.

What is claimed is:

1. A multilayer structure comprising
a first layer and
a second layer adjoining the first layer,
wherein the first layer is formed of a first material comprising a first inorganic laminar compound and
the second layer is formed of a second material comprising a second inorganic laminar compound with a volume fraction greater than the volume fraction of the first inorganic laminar compound in the first layer,
wherein the volume fraction of the first inorganic laminar compound in the first layer is from 5 to 35 vol. %.

2. The multilayer structure according to claim 1, wherein the volume fraction of the second inorganic laminar compound in the second layer is from 70 to 100 vol. %.

3. The multilayer structure according to claim 1 or 2, wherein the multilayer structure has up to two outermost layers and at least one of the outermost layers contains an inorganic laminar compound with a volume fraction of from 60 to 100 vol. %.

4. The multilayer structure according to claim 3, wherein the multilayer structure further comprises a layer of a substrate on which the first layer is disposed.

5. The multilayer structure according to claim 1 or 2, wherein the multilayer structure has up to two outermost layers and at least one of the outermost layers contains an inorganic laminar compound with a volume fraction of from 0 to 50 vol. %.

6. The multilayer structure according to claim 1 or 2, wherein the multilayer structure further comprises a layer of a substrate on which the first layer is disposed.

7. The multilayer structure according to claim 1, wherein the first and second inorganic laminar compounds have aspect ratios of from 200 to 3000.

8. The multilayer structure according to claim 1, wherein the first layer further comprises a resin.

9. The multilayer structure according to claim 8, wherein the resin is a thermoplastic resin.

* * * * *